(12) United States Patent
Dohmeier et al.

(10) Patent No.: US 10,720,787 B2
(45) Date of Patent: Jul. 21, 2020

(54) COMBINED CHARGER AND POWER CONVERTER

(71) Applicant: Delta-Q Technologies Corp., Burnaby (CA)

(72) Inventors: Nicholas Adam Dohmeier, Coquitlam (CA); Haakon MacCallum, New Westminster (CA); Christopher Jon Botting, Vancouver (CA)

(73) Assignee: DELTA-Q TECHNOLOGIES CORP., Burnaby (CA)

( * ) Notice: Subject to any disclaimer, the term of this patent is extended or adjusted under 35 U.S.C. 154(b) by 182 days.

(21) Appl. No.: 16/044,134

(22) Filed: Jul. 24, 2018

(65) Prior Publication Data

US 2019/0036366 A1 Jan. 31, 2019

Related U.S. Application Data

(60) Provisional application No. 62/537,144, filed on Jul. 26, 2017.

(51) Int. Cl.
*H02J 7/02* (2016.01)
*H02J 7/34* (2006.01)
(Continued)

(52) U.S. Cl.
CPC .............. *H02J 7/022* (2013.01); *B60L 53/24* (2019.02); *H02J 7/0003* (2013.01); *H02J 7/02* (2013.01);
(Continued)

(58) Field of Classification Search
CPC .... H02J 7/022; H02J 7/003; H02J 7/02; H02J 7/027; H02J 7/345; H02J 7/0013;
(Continued)

(56) References Cited

U.S. PATENT DOCUMENTS

| D203,543 S | 1/1966 | Coe |
| 3,938,024 A | 2/1976 | Clarke |

(Continued)

FOREIGN PATENT DOCUMENTS

| CA | 2 806 870 A1 | 4/2014 |
| WO | 2010/025596 A1 | 3/2010 |

OTHER PUBLICATIONS

Chen et al., "Digital Control for Improved Efficiency and Reduced Harmonic Distortion Over Wide Load Range in Boost PFC Rectifiers," *IEEE Transactions on Power Electronics* 25(10):2683-2692, Oct. 2010.

(Continued)

*Primary Examiner* — Robert L Deberadinis
(74) *Attorney, Agent, or Firm* — Seed Intellectual Property Law Group LLP

(57) ABSTRACT

An apparatus and method employs a rectifier, switches, and power converter that comprises a first stage, a second stage and a direct current (DC) bus between the first and second stages, to: in a first state supply rectified DC current to the first stage and a voltage adjusted current from the second stage to a load, for example a power storage device (e.g., secondary battery, ultra-capacitor(s)) at a relatively high voltage (e.g., 48 V for traction motor), and in a second state supply DC current to the first stage from the power storage device and supply a voltage adjusted current from the second stage, for example to a lower voltage DC bus or load (e.g., 12 V). The rectifier can, for example, receive grid or mains AC power.

37 Claims, 4 Drawing Sheets

(51) Int. Cl.
*H02J 7/00* (2006.01)
*H02M 1/32* (2007.01)
*B60L 53/24* (2019.01)
*H02M 1/42* (2007.01)
*H02M 1/10* (2006.01)

(52) U.S. Cl.
CPC .............. *H02J 7/027* (2013.01); *H02J 7/345* (2013.01); *H02M 1/32* (2013.01); *B60L 2210/30* (2013.01); *H02J 7/0013* (2013.01); *H02M 1/10* (2013.01); *H02M 1/4208* (2013.01)

(58) Field of Classification Search
CPC ....... B60L 2210/30; H02M 1/32; H02M 1/10; H02M 1/4208
See application file for complete search history.

(56) References Cited

U.S. PATENT DOCUMENTS

| | | |
|---|---|---|
| 4,412,277 A | 10/1983 | Mitchell |
| 4,559,590 A | 12/1985 | Davidson |
| D287,718 S | 1/1987 | Moeller |
| D292,914 S | 11/1987 | Moeller |
| D305,115 S | 12/1989 | Kondo et al. |
| 4,885,675 A | 12/1989 | Henze et al. |
| 5,001,620 A | 3/1991 | Smith |
| 5,034,871 A | 7/1991 | Okamoto et al. |
| 5,065,278 A | 11/1991 | Schultz |
| 5,077,486 A | 12/1991 | Marson et al. |
| D328,057 S | 7/1992 | Prager et al. |
| D336,074 S | 6/1993 | Friend et al. |
| D338,653 S | 8/1993 | Morgan et al. |
| D348,869 S | 7/1994 | Egger et al. |
| D351,134 S | 10/1994 | Hunziker |
| 5,355,300 A | 10/1994 | Zinn |
| D358,753 S | 5/1995 | Yoshida et al. |
| D360,186 S | 7/1995 | Netz et al. |
| 5,490,057 A | 2/1996 | Vinciarelli et al. |
| 5,602,462 A | 2/1997 | Stich et al. |
| D378,915 S | 4/1997 | Widmayer et al. |
| D379,088 S | 5/1997 | Hopper |
| D379,799 S | 6/1997 | Widmayer et al. |
| D381,011 S | 7/1997 | Widmayer et al. |
| D388,399 S | 12/1997 | Widmayer et al. |
| D398,589 S | 9/1998 | Dodson |
| D401,216 S | 11/1998 | Person et al. |
| D409,138 S | 5/1999 | Gammenthaler |
| D409,139 S | 5/1999 | Cornell et al. |
| D410,652 S | 6/1999 | Jones et al. |
| D416,873 S | 11/1999 | Korsunsky et al. |
| D427,146 S | 6/2000 | Wei |
| D427,147 S | 6/2000 | Wei |
| 6,076,594 A | 6/2000 | Kuo |
| D449,587 S | 10/2001 | Cronin |
| D449,817 S | 10/2001 | Takeuchi et al. |
| 6,307,747 B1 | 10/2001 | Farnsworth et al. |
| 6,320,772 B1 | 11/2001 | Doyama et al. |
| D458,228 S | 6/2002 | Jacobson |
| 6,462,966 B1 | 10/2002 | Leung et al. |
| 6,650,559 B1 | 11/2003 | Okamoto et al. |
| 6,671,172 B2 | 12/2003 | Carter et al. |
| D489,682 S | 5/2004 | Guillarme |
| 6,736,195 B2 | 5/2004 | Busch et al. |
| 6,809,678 B2 | 10/2004 | Vera et al. |
| 6,841,979 B2 | 1/2005 | Berson et al. |
| 6,847,195 B2 | 1/2005 | Chen |
| 6,862,201 B2 | 3/2005 | Hodge, Jr. |
| D505,915 S | 6/2005 | Hussaini et al. |
| D507,528 S | 7/2005 | Feldman et al. |
| D510,320 S | 10/2005 | Tuomola et al. |
| 7,116,090 B1 | 10/2006 | Yang et al. |
| 7,198,094 B2 | 4/2007 | Barsun et al. |
| D541,743 S | 5/2007 | Virolainen et al. |
| D541,744 S | 5/2007 | Virolainen et al. |
| D541,745 S | 5/2007 | Virolainen et al. |
| D546,282 S | 7/2007 | Wardenburg |
| D551,621 S | 9/2007 | Iacovelli et al. |
| D559,778 S | 1/2008 | Tsuzuki et al. |
| D562,765 S | 2/2008 | Tsuzuki et al. |
| 7,365,987 B2 | 4/2008 | Jeong |
| D568,841 S | 5/2008 | Fischer et al. |
| D571,314 S | 6/2008 | Horng |
| 7,535,716 B2 | 5/2009 | Fischer et al. |
| D593,512 S | 6/2009 | Lin |
| 7,616,455 B2 | 11/2009 | Cameron et al. |
| D606,017 S | 12/2009 | Charlson et al. |
| D621,812 S | 8/2010 | Wayman |
| D638,376 S | 5/2011 | Herrmann et al. |
| 7,983,043 B2 | 7/2011 | Xu et al. |
| D651,200 S | 12/2011 | Sugime et al. |
| D652,156 S | 1/2012 | Li et al. |
| D661,008 S | 5/2012 | Yuan |
| D662,880 S | 7/2012 | Scott et al. |
| D664,544 S | 7/2012 | Yi et al. |
| D667,789 S | 9/2012 | O'Neil |
| D672,730 S | 12/2012 | Lin |
| D675,622 S | 2/2013 | Petrick et al. |
| D677,621 S | 3/2013 | Beroukas et al. |
| D678,852 S | 3/2013 | Marshall |
| D682,207 S | 5/2013 | Nakahira et al. |
| D684,130 S | 6/2013 | Vincent et al. |
| D691,558 S | 10/2013 | Helosvouri et al. |
| 8,546,974 B2 | 10/2013 | Foxall et al. |
| 8,552,695 B2 | 10/2013 | Stracquadaini |
| 8,598,737 B2 | 12/2013 | Foxall et al. |
| D698,481 S | 1/2014 | Wasserman et al. |
| D702,376 S | 4/2014 | Su |
| D703,132 S | 4/2014 | Pearson et al. |
| D705,728 S | 5/2014 | Choi |
| D706,216 S | 6/2014 | Perin |
| 8,803,489 B2 | 8/2014 | Li et al. |
| D713,336 S | 9/2014 | Perin |
| 8,861,238 B2 | 10/2014 | Huang et al. |
| 8,937,469 B2 | 1/2015 | Clark et al. |
| D722,958 S | 2/2015 | Kotaniemi et al. |
| D726,141 S | 4/2015 | Wilson |
| D730,333 S | 5/2015 | Matsumoto |
| 9,028,096 B2 | 5/2015 | Verdes et al. |
| D734,250 S | 7/2015 | Rennick |
| D739,347 S | 9/2015 | Huang et al. |
| D751,241 S | 3/2016 | Aldape |
| D751,751 S | 3/2016 | Lockart et al. |
| D755,740 S | 5/2016 | Chen et al. |
| D761,472 S | 7/2016 | Zhu |
| D761,729 S | 7/2016 | Leong |
| D767,815 S | 9/2016 | Lee |
| D768,585 S | 10/2016 | Moore et al. |
| D770,975 S | 11/2016 | Nada et al. |
| 9,490,694 B2 | 11/2016 | Alam |
| D793,350 S | 8/2017 | Kenchappa |
| D796,431 S | 9/2017 | Lau et al. |
| D804,434 S | 12/2017 | Lu et al. |
| D805,473 S | 12/2017 | Montgomery et al. |
| D805,486 S | 12/2017 | Hochman et al. |
| D806,647 S | 1/2018 | Lau et al. |
| D815,592 S | 4/2018 | Lau et al. |
| D828,294 S | 9/2018 | Lau et al. |
| D829,649 S | 10/2018 | Lau et al. |
| 2002/0149951 A1 | 10/2002 | Leung et al. |
| 2004/0240182 A1 | 12/2004 | Shah |
| 2005/0061480 A1 | 3/2005 | Carter et al. |
| 2005/0105311 A1 | 5/2005 | Soldano |
| 2007/0014089 A1 | 1/2007 | Huang |
| 2007/0131387 A1 | 6/2007 | Kawabata et al. |
| 2007/0133233 A1 | 6/2007 | Cameron et al. |
| 2008/0002444 A1 | 1/2008 | Shekhawat et al. |
| 2008/0295993 A1 | 12/2008 | Chen et al. |
| 2010/0110593 A1 | 5/2010 | Kim et al. |
| 2010/0165683 A1 | 7/2010 | Sugawara |
| 2010/0259240 A1 | 10/2010 | Cuk |
| 2011/0110127 A1 | 5/2011 | Lee |
| 2011/0211377 A1 | 9/2011 | Uno |

(56) References Cited

U.S. PATENT DOCUMENTS

| | | |
|---|---|---|
| 2011/0286216 A1 | 11/2011 | Araman |
| 2011/0292703 A1 | 12/2011 | Cuk |
| 2012/0069615 A1 | 3/2012 | Tomioka |
| 2012/0249102 A1 | 10/2012 | Cuk |
| 2012/0256606 A1 | 10/2012 | Van Den Broeke |
| 2013/0051102 A1 | 2/2013 | Huang et al. |
| 2013/0235631 A1 | 9/2013 | Pahlevaninezhad et al. |
| 2014/0056045 A1 | 2/2014 | Yan et al. |
| 2014/0097808 A1 | 4/2014 | Clark et al. |
| 2014/0268952 A1 | 9/2014 | Tong |
| 2015/0171734 A1 | 6/2015 | Yu et al. |
| 2015/0263605 A1 | 9/2015 | Alam |
| 2016/0056730 A1 | 2/2016 | Yan et al. |
| 2016/0099660 A1 | 4/2016 | Khaligh et al. |

OTHER PUBLICATIONS

Clark, "Digital Control Techniques for Power Quality Improvements in Power Factor Correction Applications," Master's Thesis, University of British Columbia, Jul. 2012, 114 pages.

De Gussemé et al., "Digitally Controlled Boost Power-Factor-Correction Converts Operating in Both Continuous and Discontinuous Conduction Mode," *IEEE Transactions on Industrial Electronics* 52(1):88-97, Feb. 2005.

De Gussemé et al., "Input-Current Distortion of CCM Boost PFC Converts Operated in DCM," *IEEE Transactions on Industrial Electronics* 54(2):858-865, Apr. 2007.

De Gussemé et al., "Sample Correction for Digitally Controlled Boost PFC Converters Operating in both CCM and DCM," *Eighteenth Annual IEEE Applied Power Electronics Conference and Exposition* 1:389-395, Feb. 9-13, 2003.

de Souza et al., "A New ZVS-PWM Unity Power Factor Rectifier with Reduced Conduction Losses," *IEEE Transactions on Power Electronics* 10(6):746-752, Nov. 1995.

de Souza et al., "High Power Factor Rectifier with Reduced Conduction and Commutation Losses," 21$^{st}$ International Telecommunication Energy Conference, Copenhagen, Jun. 6-9, 1999, 5 pages.

Delta-Q Technologies Corp., "Delta-Q Technologies Introduces New Lithium-Specific Battery Charger at ProMAT 2017," published Mar. 27, 2017, retrieved from http://www.prnewswire.com/news-releases/delta-q-technologoes-introduces-new-lithium-specific-battery-charger-at-promat-2017-617167523.htm on Jun. 1, 2017, 3 pages.

Dixon, "Average Current Mode Control of Switching Power Supplies," Unitrode Application Note U-140, pp. 3-356-3-369, 1990. (14 pages).

Dixon, "Average Current Mode Control of Switching Power Supplies—Topic 5," Unitrode Corporation, pp. 5-1-5-14, 2001. (16 pages).

Erickson et al., *Fundamentals of Power Electronics,* Second Edition, Kluwer Academic Publishers, Secaucus, NJ, 2001, 12 pages, Table of Contents.

Fairchild Semiconductor, "FAN7930: Critical Conduction Mode PFC Controller," Apr. 2010, 22 pages.

Huber et al., "Performance Evaluation of Bridgeless PFC Boost Rectifiers," *IEEE Transactions on Power Electronics* 23(3):1381-1390, May 2008.

Hwang et al., "Seamless Boost Converter Control in Critical Boundary Condition for Fuel Cell Power Conditioning System," IEEE Energy Conversion Congress and Exposition, Sep. 17-22, 2011, pp. 3641-3648.

Hwang et al., "Seamless Boost Converter Control Under the Critical Boundary Condition for a Fuel Cell Power Conditioning System," *IEEE Transactions on Power Electronics* 27(8):3616-3626, Aug. 2012.

Lau et al., "Battery Charger," U.S. Appl. No. 29/530,060, filed Jun. 12, 2015, 18 pages.

Lau et al., "Battery Charger," U.S. Appl. No. 29/535,892, filed Aug. 11, 2015, 22 pages.

Lau et al., "Battery Charger," U.S. Appl. No. 29/565,135, filed May 18, 2016, 26 pages.

Lau et al., "Battery Charger," U.S. Appl. No. 29/586,567, filed Dec. 5, 2016, 18 pages.

Liou et al., "Design and Implementation of a Boost Power Factor Correction Stage Operated in Mixed-Condition Mode," International Conference of Electric Information and Control Engineering (ICEICE), Apr. 15-17, 2011, pp. 2069-2072.

Maksimović et al., "Impact of Digital Control in Power Electronics," *Proceedings of 2004 International Symposium on Power Semiconductor Devices & ICs, Kitakyushu,* pp. 13-22, 2004.

Martinez et al., "A High-Performance Single-Phase Rectifier with Input Power Factor Correction," *IEEE Transactions on Power Electronics* 11(2):311-317, Mar. 1996.

Marvi et al., "A Fully ZVS Critical Conduction Mode Boost PFC," *IEEE Transactions on Power Electronics* 27(4):1958-1965, Apr. 2012.

Moon et al., "Accurate Mode Boundary Detection in Digitally Controlled Boost Power Factor Correction Rectifiers," IEEE Energy Conversion Congress and Exposition (ECCE), Sep. 12-16, 2010, pp. 1212-1217.

Moon et al., "Autotuning of Digitally Controlled Boost Power Factor Correction Rectifiers," *IEEE Transactions on Power Electronics* 26(10):3006-3018, Oct. 2011.

Musavi et al., "A Phase-Shifted Gating Technique With Simplified Current Sensing for the Semi-Bridgeless AC-DC Converter," *IEEE Transactions on Vehicular Technology* 62(4):1568-1576, May 2013.

Roggia et al., "Digital Control System Applied to a PFC Boost Converter Operating in Mixed Conduction Mode," Brazilian Power Electronics Conference (COBEP), Sep. 2-Oct. 1, 2009, pp. 698-704.

Salmon, "Circuit topologies for pwm boost rectifiers operated from 1-phase and 3-phase ac supplies and using either single or split dc rail voltage outputs," 10$^{th}$ Annual Applied Power Electronics Conference and Exposition, Dallas, TX, Mar. 5-9, 1995, vol. 1, pp. 473-479.

Salmon, "Circuit Topologies for Single-Phase Voltage-Doubler Boost Rectifiers," *IEEE Transactions on Power Electronics* 8(4):521-529, Oct. 1993.

Sebastián et al., "The Determination of the Boundaries Between Continuous and Discontinuous Conduction Modes in PWM DC-to-DC Converters Used as Power Factor Preregulators," *IEEE Transactions on Power Electronics* 10(5):574-582, Sep. 1995.

Su et al., "An Interleaved Totem-Pole Boost Bridgeless Rectifier With Reduced Reverse-Recovery Problems for Power Factor Correction," *IEEE Transactions on Power Electronics* 25(6):1406-1415, Jun. 2010.

Tollik et al., "Comparative Analysis of 1-Phase Active Power Factor Correction Topologies," 14$^{th}$ International Telecommunications Energy Conference, Washington, DC, Oct. 4-8, 1992, pp. 517-523.

Tsai et al., "A Family of Zero-Voltage-Transition Bridgeless Power-Factor-Correction Circuits With a Zero-Current-Switching Auxiliary Switch," *IEEE Transactions on Industrial Electronics* 58(5):1848-1855, May 2011.

Van de Sype et al., "Duty-Ratio Feedforward for Digitally Controlled Boost PFC Converters," *IEEE Transactions on Industrial Electronics* 52(1):108-115, Feb. 2005.

Wang, "A New Single-Phase ZCS-PWM Boost Rectifier With High Power Factor and Low Conduction Losses," *IEEE Transactions on Industrial Electronics* 53(2):500-510, Apr. 2006.

COMBINED CHARGER AND POWER CONVERTER

TECHNICAL FIELD

The present application relates to power supplies, and particular implementations provide on-board and off-board power conversion for vehicles and machinery powered by a DC current source (e.g., battery, super-capacitor).

BACKGROUND

Description of the Related Art

A battery charger is a device that, in use, controls the storage of energy in a battery (e.g., secondary or rechargeable battery cells) by controlling a charging current to the battery. Battery chargers are used in a variety of applications including, for instance, electric vehicles (e.g., cars, trucks, golf carts, self-propelled vehicles, and the like), and machinery (e.g., floor cleaning machines, aerial work platforms, appliances, and signage).

Battery chargers for electric vehicles can be rated according to the specifications of the vehicle and the specifications of the battery to be charged. Battery chargers may, for example, be used to charge a traction battery pack of a vehicle. In some cases, an on-board battery charger is carried by the vehicle. In other cases, a charging station or off-board battery charger may be used to charge the battery when the vehicle is docked or plugged in to the charging station or off-board charger.

Some battery chargers have electrical isolation between an AC voltage source and the battery. Other battery chargers are non-isolated.

A DC/DC converter is a power converter that in operation converts a direct current (DC) voltage at a first voltage level from a source to a DC voltage at another voltage level, e.g. from 200 V DC to 48 V DC. In some cases, a DC/DC converter is isolated, and a transformer can provide electrical isolation between an input and an output. In some cases, a DC/DC converter is a resonant DC/DC converter.

BRIEF SUMMARY

An apparatus may be summarized as including a set of alternating current (AC) nodes; a first and a second set of direct current (DC) nodes; a power converter including a first stage, a second stage, and an intermediate DC voltage bus electrically coupled between the first and the second stage, the power converter operable to adjust a voltage level of a current supplied thereto; a first set of switches, the switches of the first set of switches having a first state and at least a second state, the first set of switches operable to switch between electrically coupling the first stage of the power converter to the rectifier in the first state and electrically coupling the first stage of the power converter to the first set of DC nodes in the second state; a second set of switches, the switches of the second set of switches having a first state and at least a second state, the second set of switches operable to switch between electrically coupling the second stage of the power converter to the first set of DC nodes in the first state and electrically coupling the second stage of the power converter to the second set of DC nodes in the second state; and a controller communicatively coupled to control the switches of the first and the second set of switches to place the switches of both the first and the second set of switches in the respective first states concurrently, and to place the switches of both the first and the second set of switches in the respective second states concurrently.

The apparatus may further include a rectifier electrically coupled to the set of AC nodes, the rectifier operable to convert an alternating current to a direct current, wherein the first set of switches is operable to electrically couple the first stage of the power converter to the rectifier in the first state.

The controller may be communicatively coupled to control the switches of the first and the second set of switches to place the switches of both the first and the second set of switches in the respective first states simultaneously, and to place the switches of both the first and the second set of switches in the respective second states simultaneously. The controller may be communicatively coupled to control the switches of the first and the second set of switches to place the switches of the first set of switches in the respective first state simultaneously with one another, and to place the switches of the first set of switches in the respective second state simultaneously with one another, and/or to place the switches of the second set of switches in the respective first state simultaneously with one another, and to place the switches of the second set of switches in the respective second state simultaneously with one another.

The apparatus may further include at least one of a first set of battery cells or a first set of super-capacitors having a first nominal DC voltage, the at least one of the first set of battery cells or the first set of super-capacitors electrically coupled to the first set of DC nodes. The at least one of the first set of battery cells or the first set of super-capacitors may include a traction power pack that is operable to supply current to a traction motor of an electric vehicle. When the switches of the first and the second sets of switches are in the respective first states, the power converter may be operable to supply a current at the first nominal DC voltage to charge the at least one of the first set of battery cells or the first set of super-capacitors.

The apparatus may further include a low-voltage DC subsystem having a second nominal DC voltage, the low-voltage DC subsystem electrically coupled to the second set of DC nodes. When the switches of the first and the second sets of switches are in the respective second states, the power converter may be operable to supply a current at the second DC nominal voltage level to the low-voltage DC subsystem. The second nominal DC voltage may be lower than the first nominal DC voltage. The low-voltage subsystem may be a low-voltage subsystem of an electric vehicle. The low-voltage subsystem may be at least one of a second set of battery cells or a second set of super-capacitors.

The apparatus may further include an AC voltage source electrically coupled to the set of AC nodes. The AC voltage source may be a 120 V/60 Hz mains supply. The AC voltage source may be a single-phase AC voltage source. The rectifier may be operable to receive universal AC input. At least one of the first set of switches may include a respective in-rush limiting circuit, for example an in-rush limiting relay. At least one of the second set of switches may include a protective circuit responsive to an electrical abnormality, for example a protective relay. The intermediate DC bus voltage may be selectable (for example to improve efficiency of the power converter) in response to a magnitude of a desired output voltage of the power converter. The power converter may include an isolated DC/DC converter. The power converter may include an LLC resonant DC/DC converter. At least one switch of the first or the second set of switches may include a relay. At least one of the first or the second set of switches may include a double pole double throw relay.

The apparatus may further include an auxiliary housekeeping supply, the auxiliary housekeeping supply powered by the intermediate DC bus. The auxiliary housekeeping supply may be operable to provide a low power bias to the low-voltage subsystem when the switches of the first and the second sets of switches are in the respective first states.

A method of operation of a system including a first set of switches, a second set of switches, and a power converter, the power converter having a first stage, a second stage and an intermediate bus electrically coupled between the first and the second stages, may be summarized as including selectively charging at least one of a first set of battery cells or a first set of super-capacitors by: coupling a voltage at a first nominal voltage level to the first stage of the power converter; and coupling a DC voltage at a second nominal voltage level from the second stage of the power converter to the at least one of a first set of battery cells or a first set of super-capacitors; and selectively powering a low-voltage DC subsystem by: coupling a DC voltage at the second nominal voltage level from the at least one of a first set of battery cells or a first set of super-capacitors to the first stage of the power converter; and coupling a DC voltage at a third nominal voltage level from the second stage of the power converter to the low-voltage DC subsystem. The system may further include a rectifier, and selectively charging at least one of a first set of battery cells or a first set of super-capacitors may include rectifying an alternating current (AC) voltage by the rectifier to generate a DC voltage at the first nominal voltage level. The method may further include receiving the AC voltage by the rectifier from an AC voltage source. Coupling a DC voltage at the first nominal voltage level to the first stage of the power converter and coupling a DC voltage at a second nominal voltage level from the second stage of the power converter to the at least one of a first set of battery cells or a first set of super-capacitors may include operating the switches of the first set of switches to electrically couple the first stage of the power converter to the rectifier, and operating the switches of the second set of switches to electrically couple the second stage of the power converter to the at least one of a first set of battery cells or a first set of super-capacitors.

Coupling a DC voltage at a third nominal voltage level from the second stage of the power converter to the low-voltage subsystem may include coupling the DC voltage at the third nominal voltage level to at least one of a second set of battery cells or a second set of super-capacitors electrically coupled to the low-voltage subsystem, the at least one of a second set of battery cells or a second set of super-capacitors having an associated nominal voltage level that is different from the associated nominal voltage level of the at least one of a first set of battery cells or a first set of super-capacitors.

The method may further include adjusting an intermediate DC bus voltage. In some implementations, adjusting an intermediate DC bus voltage may include adjusting an intermediate bus voltage of the intermediate DC bus to charge the at least one of a second set of battery cells or a second set of super-capacitors.

Coupling the voltage at the first nominal voltage level to the first stage of the power converter and coupling a DC voltage at a second nominal voltage level from the second stage of the power converter to the at least one of a first set of battery cells or a first set of super-capacitors may include operating the switches of the first set of switches to electrically couple the first stage of the power converter to an AC power source, and operating the switches of the second set of switches to electrically couple the second stage of the power converter to the at least one of a first set of battery cells or a first set of super-capacitors.

Coupling a DC voltage at the second nominal voltage level from the at least one of a second set of battery cells or a second set of super-capacitors to the first stage of the power converter and coupling a DC voltage at a third nominal voltage level from the second stage of the power converter to the low-voltage subsystem may include operating the switches of the first set of switches to electrically couple the first stage of the power converter to the at least one of a first set of battery cells or a first set of super-capacitors, and operating the switches of the second set of switches electrical couple the second stage of the power converter to the low-voltage sub system.

An apparatus may be summarized as including a set of alternating current (AC) nodes, a first and a second set of direct current (DC) nodes, a power converter comprising a first stage, a second stage, and an intermediate DC voltage bus electrically coupled between the first and the second stage, the power converter operable to adjust a voltage level of a current supplied thereto, a first set of switches, the switches of the first set of switches having a first state and at least a second state, the first set of switches operable to switch between electrically coupling the first stage of the power converter to the set of AC nodes in the first state and electrically coupling the first stage of the power converter to the first set of DC nodes in the second state; and a controller communicatively coupled to control the switches of the first set of switches to place the switches of the first set of switches in the respective first state concurrently, and to place the switches of the first set of switches in the respective second state concurrently. The apparatus may further include an auxiliary housekeeping supply, the auxiliary housekeeping supply powered by the intermediate DC bus.

Further aspects and details of example implementations are set forth in the drawings and following detailed discussion.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DEFINITION OF TERMS

Figure 1A:
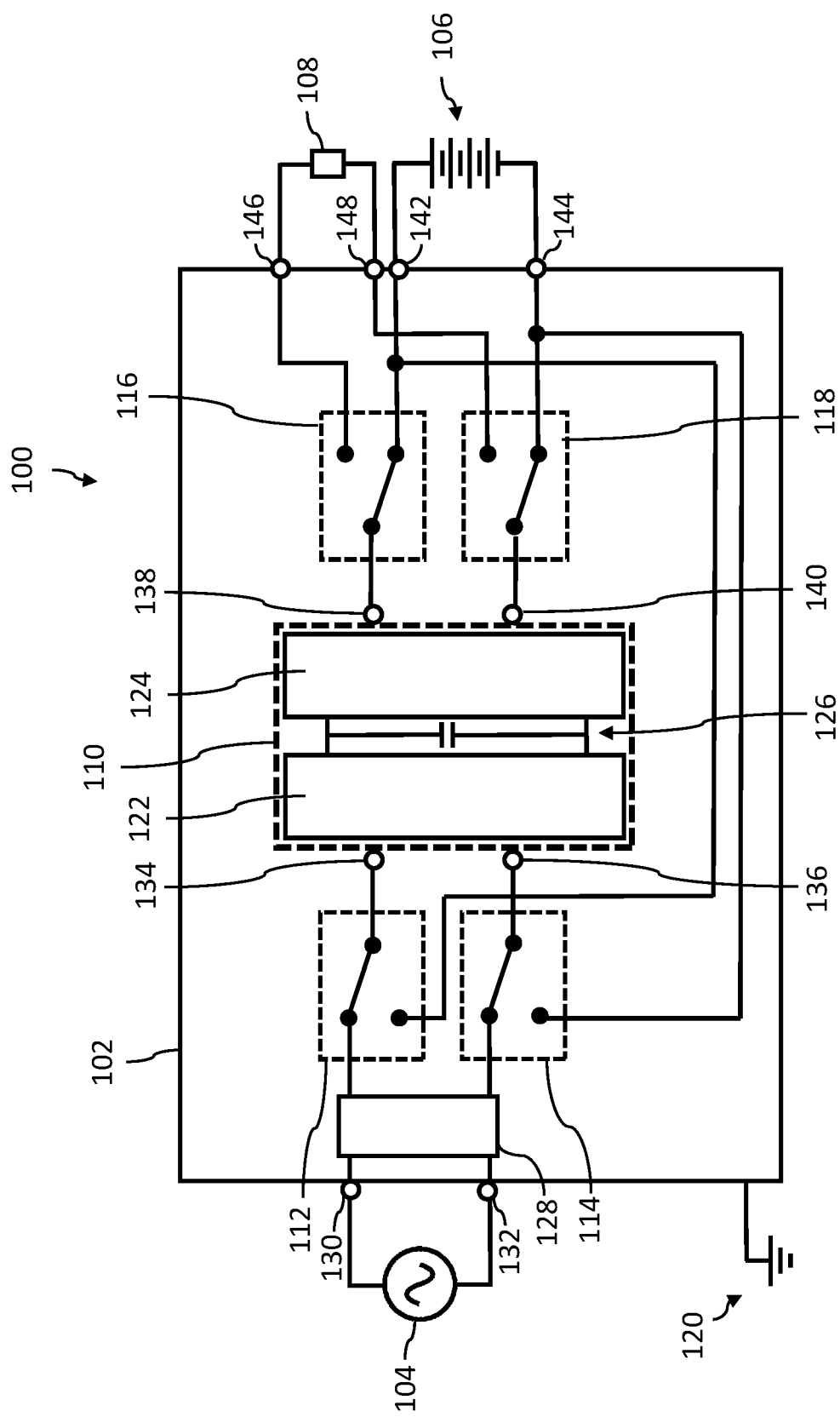
FIG. 1A is a schematic diagram illustrating an example implementation of a system including a power module charging one or more battery cells or one or more super-capacitors from an AC power source.

DC/DC Converter: An electronic circuit or electromechanical device that converts a source of direct current (DC) from one voltage level to another.

Isolated DC/DC converter: A DC/DC converter in which the input and output are electrically isolated from each other, typically using a transformer.

Resonant DC/DC converter: A resonant DC/DC converter is a DC/DC converter that includes a network of inductors and capacitors tuned to resonate at a particular frequency. A resonant LLC converter is an example of a resonant DC/DC converter.

A terminal is the point at which a conductor from an electrical component in a circuit or apparatus terminates and provides a point of connection to another electrical component or an external circuit. A terminal may be fitted with a connector, for example.

Turns Ratio: The ratio of the number of turns in the primary of a transformer to the number of turns in the secondary.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with power converters, power storage devices, switches and electrical connectors, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

A conventional approach to providing battery charging and DC/DC conversion functionality is to implement a separate battery charger and DC/DC converter.

Another option is to implement the battery charger and DC/DC converter as two separate sub-assemblies in a single housing. It may be possible to combine the sub-assemblies on a single printed circuit board (PCB), for example. Typically, few components other than wiring, fuses, heatsinks, and chassis can be shared.

Yet another option is to use a bi-directional charger power electronics design in which power can be taken from a lower voltage subsystem (e.g., at 12 V or 24 V), and transferred to a higher voltage traction pack (e.g., at 48 V), or vice versa. A shortcoming of bi-directional power conversion is that the implementation typically has additional, or expensive and complex, power conversion stages (e.g., a switch rectifier in place of a diode rectifier), and can compromise cost, efficiency, and/or reliability. An example of bi-directional power conversion is described in US patent application US20150375628A1 entitled "MULTI-DIRECTIONAL CONVERTER COMPRISING THREE PORTS AND A SINGLE TRANSFORMER FOR ELECTRIC VEHICLES."

A benefit of the technology described in the present application is that it can reduce the size, weight, and/or system cost of the electronics in an electric vehicle by implementing a battery charger and a DC/DC converter using shared components. In an example implementation, DC/DC converter functionality can be added to a battery charger using existing components of the battery charger. Existing unidirectional power conversion electronics used for battery charging can be re-purposed to perform DC/DC conversion. The DC/DC converter may be used to power a load such as a low-voltage electronic subsystem in an electric vehicle.

Figure 1B:
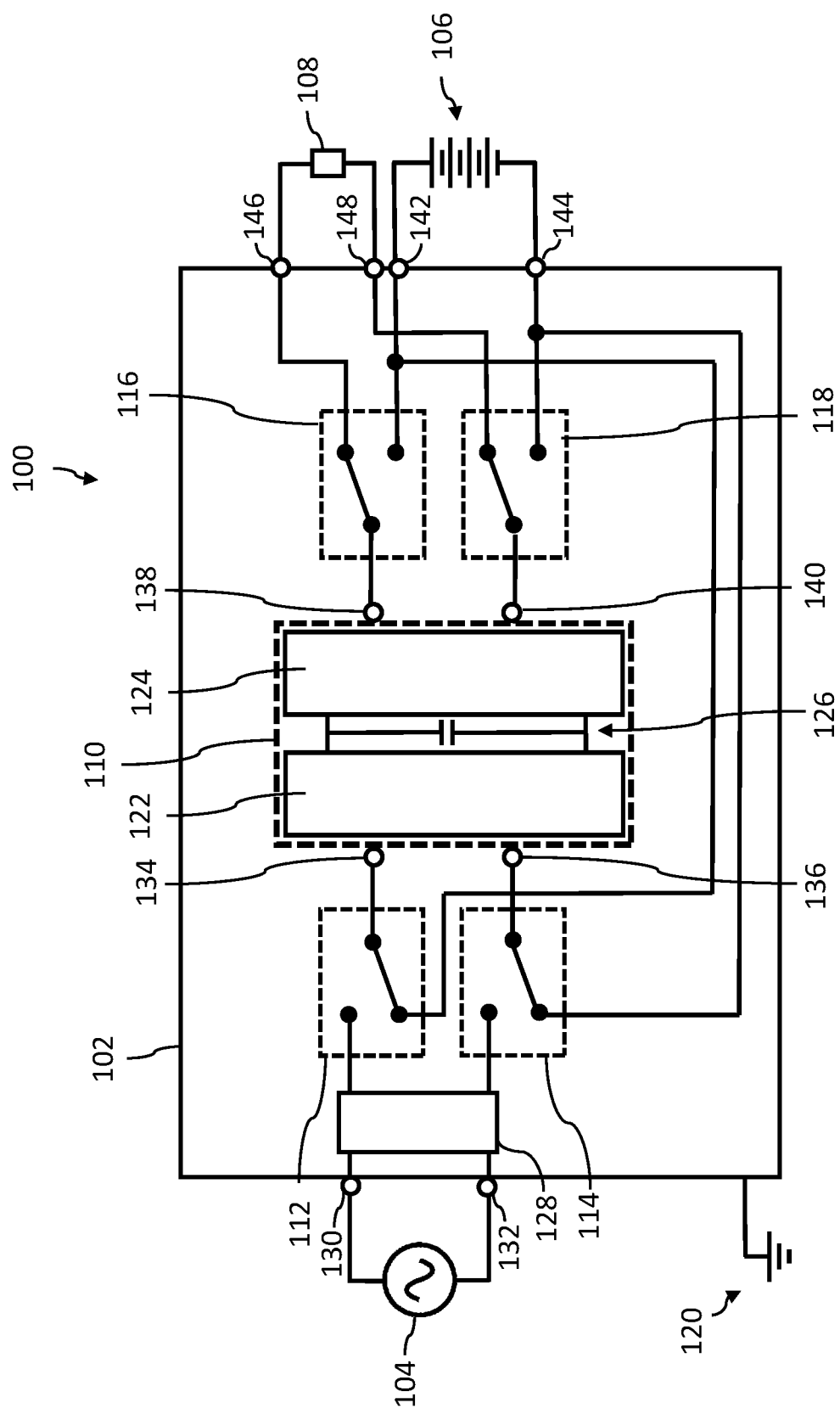
FIG. 1B is a schematic diagram illustrating an example implementation of a system including a power module operating as a DC/DC converter between a DC power source and a low-voltage DC subsystem.

FIGS. 1A and 1B are schematic diagrams illustrating an example implementation of a system 100 including a power module 102. System 100 also includes an AC voltage source 104, an energy storage device 106 and a low-voltage DC subsystem 108. Energy storage device 106 can store energy, electrical power and/or electrical current. Energy storage device 106 can, for example, include a set of one or more electrochemical storage devices, for instance battery cells (e.g., secondary chemical battery cells) or a set of one or more electrical current storage devices, for instance supercapacitor or ultra-capacitor cells, or a combination of battery cells and super-capacitor or ultra-capacitor cells. Battery cells of various rechargeable chemistries may be employed. Low-voltage DC subsystem 108 can be a portion of an electrical circuit that consumes power. Low-voltage DC subsystem 108 can be a load. Low-voltage DC subsystem 108 can be a battery such as a 12 V battery. Low-voltage DC subsystem 108 can be a set of one or more battery cells or a set of one or more super-capacitor or ultra-capacitors, which may constitute a load during some periods (e.g., while recharging) and may constitute a power source during other periods (e.g., while discharging). Low-voltage DC subsystem 108 is generally lower voltage than energy storage device 106. In one implementation, system 100 can accept universal AC input (AC 85 V-265 V and 45 Hz-65 Hz). In one implementation, AC voltage source 104 is a mains 60 Hz/120 V AC power supply. In another implementation, AC voltage source 104 is a generator. In some implementations, AC voltage source 104 is a single-phase source. In other implementations, AC voltage source 104 is a split-phase source, a three-phase source, or a line-to-line source.

Though FIGS. 1A and 1B illustrate an example implementation with AC voltage source 104, AC voltage source 104 can be replaced with a DC voltage source.

Output of power module 102 can be directed to energy storage device 106 or low-voltage DC subsystem 108. In one implementation, energy storage device 106 is a traction pack of an electric vehicle. In one implementation energy 106 is a 48 V battery. In one implementation, low-voltage DC subsystem 108 is a 12 V subsystem. In other implementations, low-voltage DC subsystem 108 is one of a 5 V or a 24 V subsystem. In other implementations, power module 102 can be used to charge one or more battery cells and/or one or more supercapacitor cells. In one implementation, low-voltage DC subsystem 108 is a 13.8 V subsystem providing charge to a 12 V battery.

The example voltages listed in the previous paragraph are nominal voltage levels and may vary about the value listed. For example, a 48 V (nominal) charger may supply current at 48 V or at a voltage that varies from 48 V. The voltage may vary during the charge, and may be potentially as high as 72 V (150% of nominal), for example.

Power module 102 comprises power converter 110, input relays 112 and 114, output relays 116 and 118, and electrical ground 120. Power converter 110 can be a single-stage or multi-stage power converter. In the example implementation illustrated in FIGS. 1A and 1B, power converter 110 is a two-stage power converter.

Power converter 110 comprises a first stage 122 and a second stage 124, separated by intermediate bus voltage energy storage capacitance 126. Intermediate bus voltage energy storage capacitance 126 comprises one or more capacitors, the capacitors generally connected in parallel. In one implementation, first stage 122 is a power-factor correction (PFC) boost stage, and operates with PFC when system 100 is charging energy storage device 106 (e.g. battery cells, super-ultra-capacitors) from AC voltage source 104. In another implementation, first stage 122 is a buck stage providing a lower intermediate bus voltage than a boost stage. For example, for an input voltage of 120 V, and an output of 48 V, power converter 110 may be implemented using a boost stage providing an intermediate bus voltage of 400 V, or a buck stage providing an intermediate bus voltage of 80 V.

In one implementation, when operating power module 102 as a battery charger to charge energy storage device 106 (see FIG. 1A), first stage 122 generates a 400 V DC nominal bus voltage. A nominal bus voltage of 400 V includes a bus voltage of 380 V, for example. In one implementation, second stage 124 is an isolated DC/DC converter stage. In another implementation, second stage 124 is an isolated resonant DC/DC converter stage. It can be beneficial for second stage 124 to be optimized, or at least tuned, for efficient charging at a nominal voltage level for energy storage device 106.

In one implementation, when operating power module 102 as a DC/DC converter to charge low-voltage DC subsystem 108 (see FIG. 1B), first stage 122 can be adjusted to generate a lower intermediate DC bus voltage (e.g., a DC bus voltage of 100 V). While lower voltage operation of the intermediate DC bus reduces energy storage, energy storage is less important when the input power is from a fixed DC source.

Typically, when second stage 124 comprises an isolated DC/DC converter, second stage 124 has an optimal, or at least preferred, operating point that can depend, at least in part, on a turns ratio of an isolation transformer. In one implementation, power module 102, operated as a battery charger to charge a 48 V traction pack from a DC bus voltage at 400 V DC, has approximately an 8:1 turns ratio in the isolation transformer. Operating power module 102 to charge a 12 V battery, or power a 12 V load or low-voltage subsystem, can be done efficiently from an intermediate DC bus at 100 V, i.e., with the same approximately 8:1 turns ratio of the isolation transformer. Similarly, charging a 24 V battery, or powering a 24 V load or low-voltage subsystem, can be done efficiently from an intermediate DC bus at 200 V with the same 8:1 turns ratio of the isolation transformer.

Varying the intermediate DC bus voltage as described above can be particularly beneficial for DC/DC conversion stages having limited output ranges, such as LLC resonant DC/DC conversion stages. Varying the intermediate DC bus voltage as described above can provide desirably high output power at low voltage outputs such as 5 V, 12 V and 24 V.

It can also be beneficial for the DC/DC converter to be an isolated DC/DC converter, for example, to enable commercial use and safer operations.

AC voltage source 104 is electrically coupled to a rectifier 128 via nodes 130 and 132. Nodes 130 and 132 can be input terminals of power module 102. In some implementations, AC voltage source 104 is electrically coupled to rectifier 128 via one or more additional electrical components such as a fuse or filter (not shown in FIGS. 1A and 1B). In one implementation, rectifier 128 is a diode bridge rectifier. In another implementation, rectifier 128 is an active rectification stage. The active rectification stage may include one or more switches such as metal-oxide-semiconductor field-effect transistor (MOSFET) switches. When AC voltage source 104 is a three-phase AC voltage source, rectifier 128 can be a three-phase bridge rectifier.

Power converter 110 also includes input terminals 134 and 136, and output terminals 138 and 140.

FIG. 1A is a schematic diagram illustrating an example implementation of system 100 during operation to charge energy storage device 106 using AC voltage source 104. AC voltage source 104 is electrically coupled to input terminals 134 and 136 of power converter 110 via rectifier 128 and input relays 112 and 114. In some implementations, AC voltage source 104 is electrically coupled to input terminals 134 and 136 via one or more additional electrical components such as a fuse, electromagnetic interference (EMI) filter, or inrush protection circuit (not shown in FIGS. 1A and 1B).

Output terminals 138 and 140 of power converter 110 are electrically coupled to a positive and a negative terminal of energy storage device 106, respectively, via output relays 116 and 118, and nodes 142 and 144. In some implementations, output terminals 138 and 140 are electrically coupled to energy storage device 106 via one or more additional electrical components such as a fuse, or electromagnetic interference (EMI) filter (not shown in FIGS. 1A and 1B).

Input relays 112 and 114, and output relays 116 and 118, can be implemented by suitable switching elements, and are referred to in the present application as switches or relays. Suitable switching elements may include a MOSFET switch, or an insulated-gate bipolar transistor (IGBT) switch, for example.

FIG. 1B is a schematic diagram illustrating an example implementation of system 100 during operation to provide power to low-voltage DC subsystem 108 using energy storage device 106. As described above, energy storage device 106 can be a traction battery. energy storage device 106 is electrically coupled to input terminals 134 and 136 of power converter 110 via input relays 112 and 114. Output terminals 138 and 140 of power converter 110 are electrically coupled to low-voltage DC subsystem 108 via output relays 116 and 118, and nodes 146 and 148.

In some implementations, existing relays common to battery charging systems can be re-purposed as input and output relays 112, 114, 116, and 118 of FIGS. 1A and 1B. A relay may exist on the input side of a charging system to disconnect the input of the battery charger (such as power converter 110 of FIGS. 1A and 1B) from an AC line (such as AC voltage source 104 of FIGS. 1A and 1B) to limit an in-rush current. A relay may exist on the output side of a charging system to disconnect the output of the battery charger from a battery (such as energy storage device 106 of FIGS. 1A and 1B) when the battery charger is not charging the battery. Disconnecting the battery charger from the battery when not charging can be beneficial for safety reasons and/or to provide reverse polarity protection, for example.

In some implementations, additional relays (not shown in FIGS. 1A and 1B) are included in system 100, for example for regulatory reasons.

As illustrated in FIGS. 1A and 1B, input relays 112 and 114 can be used to connect input terminals of power converter 110 to either a rectified AC source or to a battery (such as a traction battery), in addition to optionally providing in-rush current limiting. Typically, a relay to limit in-rush current can be located before or after the rectifier. It can be particularly beneficial in the presently described systems and methods to locate an in-rush current limiting relay after the rectifier, and re-purpose it as described above.

As illustrated in FIGS. 1A and 1B, output relays 116 and 118 can be used to electrically couple output terminals of power converter 110 to either energy storage device 106 (such as a traction battery) or to low-voltage DC subsystem 108 (such as a 12 V subsystem), in addition to optionally providing safety or reverse polarity protection. In some implementations, output terminals of power converter 110 are electrically coupled to either energy storage device 106 or low-voltage DC subsystem 108 via one or more additional electrical components such as a fuse or filter (not shown in FIGS. 1A and 1B).

In one implementation, each of input relays 112 and 114, and each of output relays 116 and 118, is a single pole double throw (SPDT) relay. In another implementation, input relays 112 and 114 can be combined using a double pole double throw (DPDT) relay. Similarly, output relays 116 and 118 can be combined using a DPDT relay. In yet another implementation, input relays 112 and 114, and output relays 116 and 118 are implemented using single pole single throw (SPST) relays. In yet another implementation, input relays 112 and 114, and output relays 116 and 118 are implemented using solid state switches.

In another implementation, the output relays are not populated, and there is only one output. Nonetheless, the system in this implementation can provide for a housekeeping power supply to be powered from the AC voltage source during charging of the battery, and from the battery voltage when the charger is idle. A benefit of this mode of operation is that a microcontroller can be powered after charging is finished, and can monitor the system after charging. Another benefit, as mentioned elsewhere in the present application, is that the quiescent draw of power (to the housekeeping power supply) from the AC voltage source can be eliminated, or at least reduced.

A benefit of the technology described in the present application is that it can be implemented using existing battery charger electronics with the addition of one or more relays. In the implementations described above, no additional, or bi-directional, power conversion electronics is included. In electric vehicle applications, main charger power train and controls, typically built to automotive reliability standards and able to provide low-noise operation appropriate for off-line power conversion, can be used as a DC/DC converter during vehicle operation. While particularly suited to automotive applications, the systems and methods described above can be used in other applications and use cases.

System 100 of FIGS. 1A and 1B can include a controller (not shown in FIGS. 1A and 1B). The controller can control and/or synchronize the state of the input and output relays, for example. In some implementations, system capabilities such as data logging, advanced charging algorithms, and user and communication interfaces (e.g., Universal Serial Bus (USB) and Controller Area Network (CAN) bus) can be extended to include power module 102.

In operation of system 100, the controller can place the input and output relays in the states shown in FIG. 1A concurrently for example during operation to charge energy storage device 106 using AC voltage source 104. In operation of system 100, the controller can place the input and output relays in the states shown in FIG. 1B concurrently, for example during operation to provide power to low-voltage DC subsystem 108 using energy storage device 106. In the present application, concurrently means overlapping for at least a period of time. In some implementations, the controller can cause the input and output relays to switch simultaneously (i.e. at approximately the same time) from one state to another. In other implementations, the controller can cause the input and output to switch at different times.

An operating mode of system 100 can include an "enable" or "key on/ignition" signal to enable operation of power module 102 as a DC-DC converter. Another operating mode of power module 102 can include automatic switching between operation as a battery charger and operation as a DC-DC converter. For example, the controller can cause power module 102 to operate as a) a battery charger when an AC voltage source is present, and b) a DC/DC converter when an AC voltage source is absent, and to cease operation when neither AC nor DC input is present.

In one implementation, operation of system 100 can include determining by the controller the state of charge of the battery. When the charge is complete, the controller can switch the input from the AC voltage source to a DC battery, thereby eliminating, or at least reducing a quiescent draw of power from the AC source. The mode of operation described above can, for example, provide improved efficiency, and compliance to regulations.

In another implementation, operation of system 100 can include controlling power module 102 using one or more of charging time, battery voltage, battery state of charge, time of day, and utility pricing tiers.

In another mode of operation, when power module 102 is operated as a DC-DC converter, the output is a fixed regulated voltage output (e.g. 12 V or 13.8 V), and system 100 is controlled to charge a battery (e.g. 12 V battery) intelligently, for example to improve speed of charge or prolong battery life.

In some implementations, the battery charger electronics may be modified to allow them to operate at a lower input and output voltages. Modifications can include changes to voltage-sensing and current-sensing circuits. A benefit of the technology described above is that the electronics can be optimized, or at least tuned, for battery charging, while providing adequate performance as a DC/DC converter.

Another benefit of the technology described in the present application is that a DC housekeeping supply (used, for example, to power USB devices, microcontrollers and the like) can be eliminated from the system. As discussed elsewhere in the present application, a housekeeping supply can be powered by the intermediate DC voltage bus.

In one implementation of the systems and methods described above, power module 102 further includes a subsystem (not shown in FIGS. 1A and 1B) providing a low-voltage output suitable for use as an auxiliary power supply referred to in the present application as a housekeeping supply. While during normal operation of power module 102, power module 102 operates as either a battery charger or a DC/DC converter, there can be situations when it would be beneficial to provide a small low-voltage bias during charging. The housekeeping supply can provide a suitable low-power output to the low-voltage subsystem output when power module 102 is in charging mode.

In another implementation, power module 102 can be operated in a mode in which power module 102 alternates between battery charger and DC/DC converter. In this mode, power module 102 operates for a first period of time as a battery charger, and for a second period of time as a DC/DC converter while still connected to AC power. The mode can be beneficial, for example, when the system includes a low-voltage subsystem battery that also requires charging.

Figure 1C:
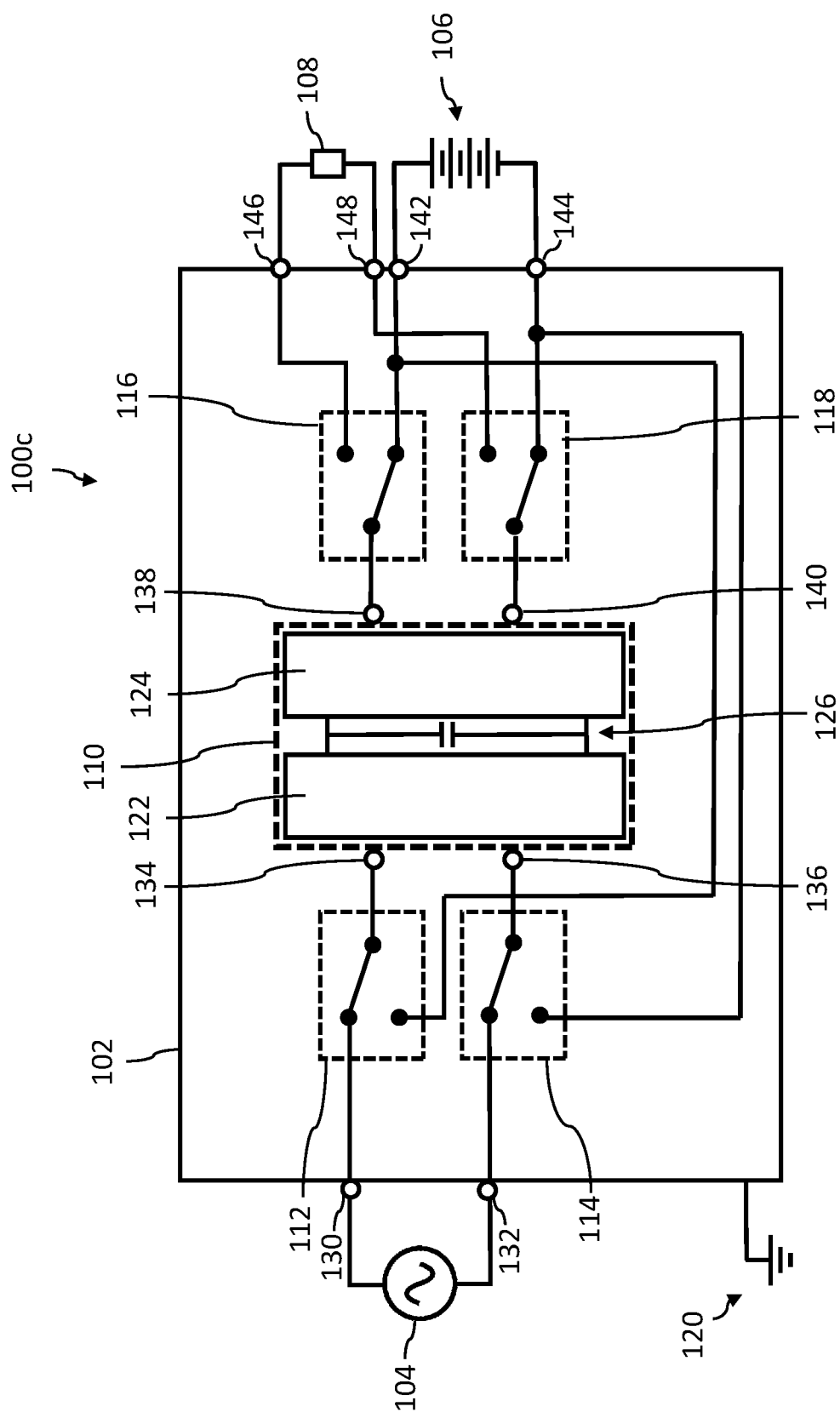
FIG. 1C is a schematic diagram illustrating another example implementation of a system including a power module charging one or more battery cells or one or more super-capacitors from an AC power source.
Figure 1D:
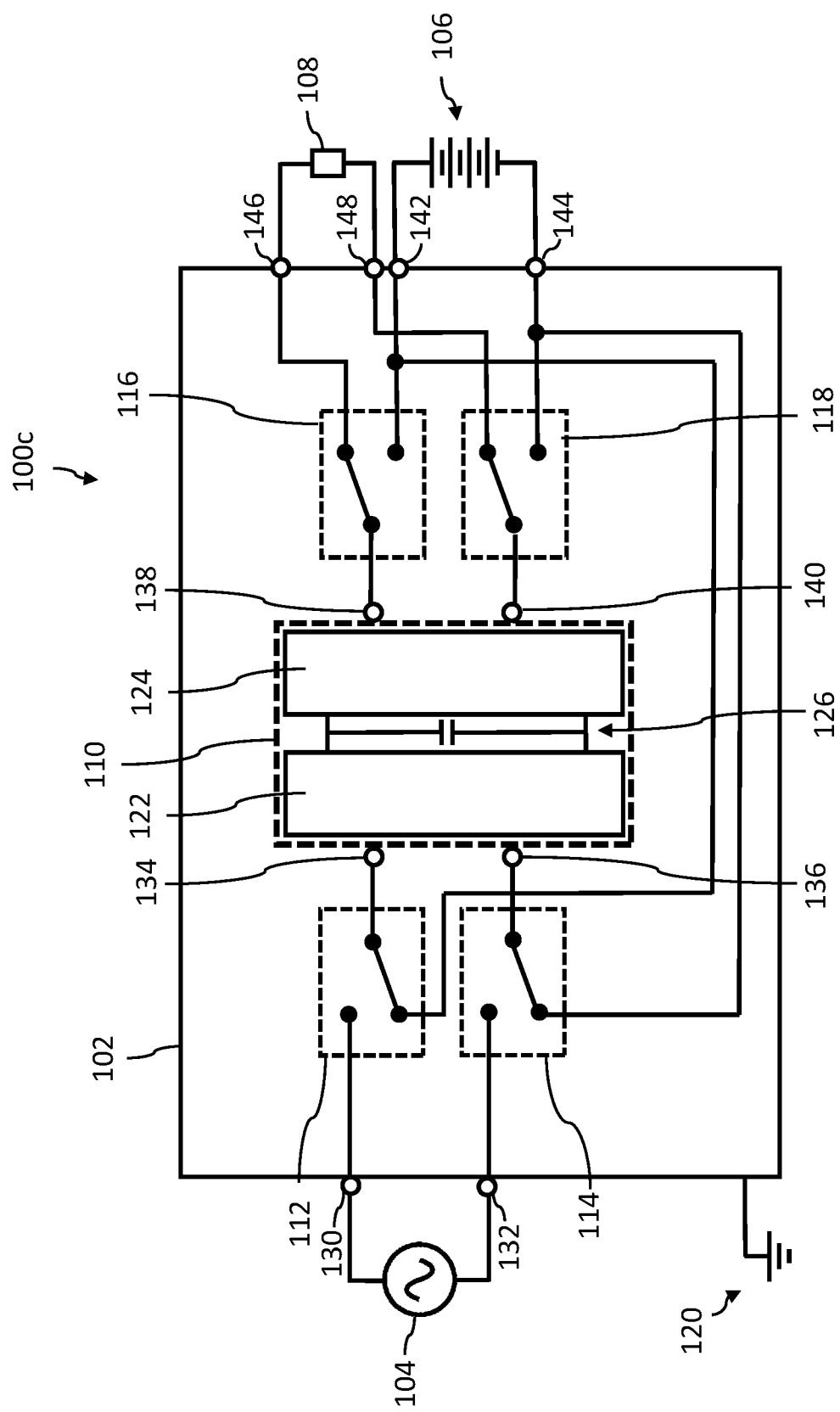
FIG. 1D is a schematic diagram illustrating another example implementation of a system including a power module operating as a DC/DC converter between a DC power source and a low-voltage DC subsystem.

FIGS. 1C and 1D are schematic diagrams illustrating another example implementation of a system 100c including a power module 102. FIG. 1C is a schematic diagram illustrating system 100c during operation to charge energy storage device 106 using AC voltage source 104. FIG. 1D is a schematic diagram illustrating system 100c during operation to provide power to low-voltage DC subsystem 108 using energy storage device 106. In system 100c, the first stage 122 of power converter 110 is a bridgeless AC-DC converter, and power module 102 does not include rectifier 128 shown in the example implementation illustrated in FIGS. 1A and 1B. A bridgeless AC-DC converter can have the AC source directly connected via nodes 130 and 132 to input relays 112 and 114, and can also have DC (from the traction battery) directly connected.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). In another implementation, the present subject matter may be implemented via embedded software and/or firmware and microcontrollers. Those of skill in the art will recognize that many of the methods or algorithms set out herein may employ additional acts, may omit some acts, and/or may execute acts in a different order than specified.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. Provisional Application No. 62/537,144, filed Jul. 26, 2017 are incorporated herein by reference, in their entirety.

What is claimed is:

1. An apparatus comprising:
a set of alternating current (AC) nodes;
a first and a second set of direct current (DC) nodes;
a power converter comprising a first stage, a second stage, and an intermediate DC voltage bus electrically coupled between the first and the second stage, the power converter operable to adjust a voltage level of a current supplied thereto;
a first set of switches, the switches of the first set of switches having a first state and at least a second state, the first set of switches operable to switch between electrically coupling the first stage of the power converter to the set of AC nodes in the first state and electrically coupling the first stage of the power converter to the first set of DC nodes in the second state;
a second set of switches, the switches of the second set of switches having a first state and at least a second state, the second set of switches operable to switch between electrically coupling the second stage of the power converter to the first set of DC nodes in the first state and electrically coupling the second stage of the power converter to the second set of DC nodes in the second state; and
a controller communicatively coupled to control the switches of the first and the second set of switches to place the switches of both the first and the second set of switches in the respective first states concurrently, and to place the switches of both the first and the second set of switches in the respective second states concurrently.

2. The apparatus of claim 1, further comprising:
a rectifier electrically coupled to the set of AC nodes, the rectifier operable to convert an alternating current to a direct current, wherein the first set of switches is operable to electrically couple the first stage of the power converter to the rectifier in the first state.

3. The apparatus of claim 1, wherein the controller is communicatively coupled to control the switches of the first and the second set of switches to place the switches of both the first and the second set of switches in the respective first states simultaneously, and to place the switches of both the first and the second set of switches in the respective second states simultaneously.

4. The apparatus of claim 1, wherein the controller is communicatively coupled to control the switches of the first and the second set of switches to place the switches of the first set of switches in the respective first state simultaneously with one another, and to place the switches of the first set of switches in the respective second state simultaneously with one another, and/or to place the switches of the second set of switches in the respective first state simultaneously with one another, and to place the switches of the second set of switches in the respective second state simultaneously with one another.

5. The apparatus of claim 1, further comprising:
at least one of a first set of battery cells or a first set of super-capacitors having a first nominal DC voltage, the at least one of the first set of battery cells or the first set of super-capacitors electrically coupled to the first set of DC nodes.

6. The apparatus of claim 5 wherein the at least one of the first set of battery cells or the first set of super-capacitors comprises a traction power pack that is operable to supply current to a traction motor of an electric vehicle.

7. The apparatus of claim 5 wherein, when the switches of the first and the second sets of switches are in the respective first states, the power converter is operable to supply a current at the first nominal DC voltage to charge the at least one of the first set of battery cells or the first set of super-capacitors.

8. The apparatus of claim 1, further comprising:
a low-voltage DC subsystem having a second nominal DC voltage level, the low-voltage DC subsystem electrically coupled to the second set of DC nodes.

9. The apparatus of claim 8 wherein, when the switches of the first and the second sets of switches are in the respective second states, the power converter is operable to supply a current at the second DC nominal voltage level to the low-voltage DC subsystem.

10. The apparatus of claim 9 wherein the second nominal DC voltage is lower than the first nominal DC voltage.

11. The apparatus of claim 10 wherein the low-voltage subsystem is a low-voltage subsystem of an electric vehicle.

12. The apparatus of claim 10 wherein the low-voltage subsystem comprises at least one of a second set of battery cells or a second set of super-capacitors.

13. The apparatus of claim 1, further comprising an AC voltage source electrically coupled to the set of AC nodes.

14. The apparatus of claim 13 wherein the AC voltage source is a 120 V/60 Hz mains supply.

15. The apparatus of claim 13 wherein the AC voltage source is a single-phase AC voltage source.

16. The apparatus of claim 2 wherein the rectifier is operable to receive universal AC input.

17. The apparatus of claim 1 wherein at least one of the first or the second set of switches includes a respective in-rush limiting circuit.

18. The apparatus of claim 1 wherein at least one of the first or the second set of switches includes a protective circuit responsive to an electrical abnormality.

19. The apparatus of claim 1 wherein the intermediate DC bus voltage is selectable in response to a magnitude of a desired output voltage of the power converter.

20. The apparatus of claim 1 wherein the power converter comprises an isolated DC/DC converter.

21. The apparatus of claim 1 wherein the power converter comprises an LLC resonant DC/DC converter.

22. The apparatus of claim 1 wherein at least one switch of the first or the second set of switches includes a relay.

23. The apparatus of claim 1 wherein at least one of the first or the second set of switches includes a double pole double throw relay.

24. The apparatus of claim 1, further comprising an auxiliary housekeeping supply, the auxiliary housekeeping supply powered by the intermediate DC bus.

25. The apparatus of claim 24, wherein the auxiliary housekeeping supply is operable to provide a low power bias to the low-voltage subsystem when the switches of the first and the second sets of switches are in the respective first states.

26. A method of operation of a system comprising a first set of switches, a second set of switches, and a power converter, the power converter having a first stage, a second stage and an intermediate DC bus electrically coupled between the first and the second stages, the method comprising:
selectively charging at least one of a first set of battery cells or a first set of super-capacitors by:
coupling a voltage at a first nominal voltage level to the first stage of the power converter; and
coupling a DC voltage at a second nominal voltage level from the second stage of the power converter to the at least one of a first set of battery cells or a first set of super-capacitors; and
selectively powering a low-voltage DC subsystem by:
coupling a DC voltage at the second nominal voltage level from the at least one of a first set of battery cells or a first set of super-capacitors to the first stage of the power converter; and
coupling a DC voltage at a third nominal voltage level from the second stage of the power converter to the low-voltage DC subsystem.

27. The method of claim 26, the system further comprising a rectifier, wherein selectively charging at least one of a first set of battery cells or a first set of super-capacitors includes rectifying an alternating current (AC) voltage by the rectifier to generate a DC voltage at the first nominal voltage level.

28. The method of claim 27, further comprising:
receiving the AC voltage by the rectifier from an AC voltage source.

29. The method of claim 27 wherein coupling a DC voltage at the first nominal voltage level to the first stage of the power converter and coupling a DC voltage at a second nominal voltage level from the second stage of the power converter to the at least one of a first set of battery cells or a first set of super-capacitors comprises: operating the switches of the first set of switches to electrically couple the first stage of the power converter to the rectifier, and operating the switches of the second set of switches to electrically couple the second stage of the power converter to the at least one of a first set of battery cells or a first set of super-capacitors.

30. The method of claim 26 wherein coupling a DC voltage at a third nominal voltage level from the second stage of the power converter to the low-voltage subsystem includes coupling the DC voltage at the third nominal voltage level to at least one of a second set of battery cells or a second set of super-capacitors electrically coupled to the low-voltage subsystem.

31. The method of claim 26, wherein the third nominal voltage level is different from the associated nominal voltage level of the at least one of a first set of battery cells or a first set of super-capacitors.

32. The method of claim 26, further comprising:
adjusting an intermediate DC bus voltage of the intermediate DC bus.

33. The method of claim 32, wherein adjusting an intermediate DC bus voltage of the intermediate DC bus may include adjusting an intermediate bus voltage of the intermediate DC bus to charge the at least one of a second set of battery cells or a second set of super-capacitors.

34. The method of claim 26 wherein coupling the voltage at the first nominal voltage level to the first stage of the power converter and coupling a DC voltage at a second nominal voltage level from the second stage of the power converter to the at least one of a first set of battery cells or a first set of super-capacitors comprises: operating the switches of the first set of switches to electrically couple the first stage of the power converter to an AC power source, and operating the switches of the second set of switches to electrically couple the second stage of the power converter to the at least one of a first set of battery cells or a first set of super-capacitors.

35. The method of claim 26 wherein coupling a DC voltage at the second nominal voltage level from the at least one of a first set of battery cells or a first set of super-capacitors to the first stage of the power converter and coupling a DC voltage at a third nominal voltage level from the second stage of the power converter to the low-voltage subsystem comprises: operating the switches of the first set of switches to electrical couple the first stage of the power converter to the at least one of a first set of battery cells or a first set of super-capacitors, and operating the switches of the second set of switches electrically couple the second stage of the power converter to the low-voltage subsystem.

36. An apparatus comprising:
a set of alternating current (AC) nodes;
a first and a second set of direct current (DC) nodes;
a power converter comprising a first stage, a second stage, and an intermediate DC voltage bus electrically coupled between the first and the second stage, the power converter operable to adjust a voltage level of a current supplied thereto;
a first set of switches, the switches of the first set of switches having a first state and at least a second state, the first set of switches operable to switch between electrically coupling the first stage of the power converter to the set of AC nodes in the first state and electrically coupling the first stage of the power converter to the first set of DC nodes in the second state; and
a controller communicatively coupled to control the switches of the first set of switches to place the switches of the first set of switches in the respective first state concurrently, and to place the switches of the first set of switches in the respective second state concurrently.

37. The apparatus of claim 36, further comprising an auxiliary housekeeping supply, the auxiliary housekeeping supply powered by the intermediate DC bus.

* * * * *